United States Patent [19]

Bar-David

[11] Patent Number: 5,596,601
[45] Date of Patent: Jan. 21, 1997

[54] METHOD AND APPARATUS FOR SPREAD SPECTRUM CODE PULSE POSITION MODULATION

[75] Inventor: Israel Bar-David, Haifa, Israel

[73] Assignee: Lucent Technologies Inc., Murray Hill, N.J.

[21] Appl. No.: 298,260

[22] Filed: Aug. 30, 1994

[51] Int. Cl.$^6$ ................................ H04K 1/00; H03K 7/04
[52] U.S. Cl. .................... 375/207; 375/200; 375/343; 375/239; 332/112; 370/213
[58] Field of Search ............................ 375/200, 207, 375/239, 343; 332/112; 329/313; 370/10, 8

[56] References Cited

U.S. PATENT DOCUMENTS 5,157,686  10/1992  Omura et al. ............................ 375/200
5,166,952  11/1992  Omura et al. ............................ 375/200

FOREIGN PATENT DOCUMENTS

PCT/US94/
  12466  10/1994  WIPO .

OTHER PUBLICATIONS

Okazaki, I., and Hasegawa, T., "Spread Spectrum Pulse Position Modulation—A Simple Approach for Shannon's Limit—," Singapore ICCS/ISITA '92, Nov. 16–20, 1992, Singapore, pp. 300–304.

Okazaki, I., and Hasegawa, T., "Spread Spectrum Pulse Position Modulation and Its Asynchronous CDMA Performance—A Simple Approach For Shannon's Limit—," IEEE Second International Symposium on Spread Spectrum Techniques and Applications, Nov. 29–Dec. 2, 1992, Yokohama, Japan, pp. 325–328.

U.S. patent application Ser. No. 08/146,490, dated Nov. 1, 1993, (not enclosed).

Zhang, N., and Golomb, S. W., "Sixty Phase Generalized Barker Sequences," IEEE Trans. on Information Theory, vol. 35, No. 4, (Jul. 1989), pp. 911–912.

Primary Examiner—Stephen Chin
Assistant Examiner—T. Ghebretinsae

[57] ABSTRACT

A spread spectrum code pulse position modulated communication system is disclosed. The frequency spectrum of a transmitted signal is spread by encoding bits with a predefined spectrum-spreading codeword which is in accordance with regulatory requirements or other standardization decisions. When the predefined spread spectrum codeword is passed through a filter matched to the characteristics of the codeword, a peak is detected in the main lobe. A positive main lobe can indicate a binary value of "0" and a negative main lobe, associated with the inverse of the predefined codeword, can represent a binary value of "1". Additional information is conveyed by modulating the position of the center of the codeword within the symbol duration. In one embodiment, the position of the center of the codeword is varied among eight positions. Thus, eight signal states are available, and three additional bits may thereby be conveyed. Two differently and independently time-shifted spread spectrum codewords may be modulated, each with one of two orthogonal carrier signals, such as a sine and a cosine wave, thereby conveying a total of eight bits per symbol duration. Here, a symbol duration is the duration of a codeword.

20 Claims, 3 Drawing Sheets

METHOD AND APPARATUS FOR SPREAD SPECTRUM CODE PULSE POSITION MODULATION

FIELD OF THE INVENTION

The present invention relates to a method and apparatus for modulation and demodulation of a communication signal, and more particularly, to a method and apparatus for modulation and demodulation of a communication signal where spectral spreading is desired.

BACKGROUND OF THE INVENTION

In many communication applications, it is often desired, or required, to spread the frequency spectrum of a transmitted signal by a given factor. For example, in the United States, the Industrial, Scientific and Medical (ISM) frequency band has historically been reserved for the operation of industrial, scientific and medical instruments. Recently, however, the Federal Communications Commission (FCC) has indicated that the ISM band may be utilized under certain conditions for communication applications, such as local area networks (LANs). Specifically, in order not to interfere with the operation of industrial, scientific and medical devices, the FCC requires that the frequency spectrum for communications in the ISM band be spread by a factor of at least 10. This is typically accomplished by encoding each bit to be transmitted using a predefined codeword, or pattern, consisting of at least 10 "chips" or "signal elements" which are all transmitted in the time frame normally allocated for a single bit.

The Institute for Electrical and Electronic Engineers has developed a standard for communications in the ISM band that utilizes the well known Barker code having a defined pattern of eleven chips, namely, "00011101101", as the basic information carrier. Thus, the Barker code may be utilized to represent a value of binary "0" and the inverse of the Barker code may be utilized to represent a value of binary "1", or vice-versa. Accordingly, for each transmitted eleven chip Barker code, one bit of information is conveyed.

Frequently, such spread spectrum systems will increase the bit rate by transmitting a number of bits during a single bit duration by utilizing phase-shift keying (PSK) modulation, wherein the phase of the carrier signal is shifted to represent data. In a quadrature phase-shift keying (QPSK) implementation, phase shifts in multiples of 90° are utilized. Thus, four possible signal states may be represented by each of the four phases. Accordingly, each signal element can represent two bits rather than one.

Although additional gains in the bit rate could be achieved by extending these phase shifting schemes, for example, to transmit three bits per signal element, by providing eight phase angles, the increase in transmission power that would be required to achieve adequate error rate performance presently makes such schemes impractical.

As is apparent from the above discussion of conventional spread spectrum modulation techniques, a need exists for a spread spectrum modulation technique that increases the number of bits that are transmitted per signal element without significantly adding to the power requirements of the transmitter.

SUMMARY OF THE INVENTION

Generally, according to one aspect of the invention, a communication system, suitable for use in frequency spreading applications, employs spread spectrum encoding to convey at least one bit of information per symbol duration, and conveys additional bits by modulating the position of the center of the transmitted spread spectrum codeword within the symbol duration which, upon matched filtering, modulates the position of the main lobe in the receiver output.

According to one feature of the invention, the frequency spectrum of the transmitted signal is spread in accordance with regulatory requirements or other criteria by encoding at least one bit of information with a predefined spread spectrum codeword. When the predefined codeword is passed through a filter matched to the characteristics of the codeword, a peak is detected in the main lobe. A positive main lobe can indicate a binary value of "0" and a negative main lobe, associated with the inverse of the predefined codeword, can represent a binary value of "1".

Another aspect of the invention will convey additional bits of information per symbol duration by modulating the position of the center of the codeword within the symbol duration. In one embodiment, the position of the center of the codeword may be manipulated within the defined symbol period by delaying the transmission of the codeword, by a positive or negative time period relative to the symbol duration. In one preferred embodiment, the position of the center of the codeword is varied among eight positions. Thus, eight signal states are available, thereby conveying three additional bits.

According to a further feature of the invention, additional bits may be conveyed by independently generating a plurality of time-shifted spread spectrum codewords and modulating each of the plurality of codewords with a carrier signal having a unique phase, amplitude or frequency. In one embodiment, two independently generated codewords are each modulated by an orthogonal carrier signal, such as a sine and a cosine wave, thereby conveying a total of eight bits per symbol duration.

A more complete understanding of the present invention, as well as further features and advantages of the invention, will be obtained by reference to the detailed description and drawings.

DETAILED DESCRIPTION

The present invention provides a method and apparatus for modulating and demodulating a communication signal using spread spectrum encoding. The present invention improves on conventional spread spectrum modulation techniques by also modulating the position of the transmitted spread spectrum code which, upon matched filtering, modulates the position of the main lobe in the receiver output. In this manner, additional information may be conveyed per symbol duration.

As previously indicated, it is often desirable, or required, to spread the frequency spectrum of a transmitted signal by a factor of n. This is typically accomplished by encoding each bit to be transmitted using a predefined codeword, or pattern, consisting of n "chips" or "signal elements" which are all transmitted in the time frame normally allocated for a single bit. In a preferred embodiment, often referred to as antipodal encoding, the predefined codeword may be utilized to represent a value of binary "0" and the inverse of the predefined codeword may be utilized to represent a value of binary "1". Alternatively, a bit of information can be conveyed by selecting from one of two predefined codewords.

A number of spread spectrum codes, consisting of a number of consecutive positive and negative signal elements, have been discovered which have unique properties that optimize the detection of the transmitted information. For example, a number of well known spread spectrum codes have been discovered by Barker, Neuman-Hofman, and Williard. For a discussion of these and other suitable spread spectrum codes, see Ning Zhan and S. W. Golomb, "Sixty Phase Generalized Barker Sequences," I.E.E.E. Trans. on Information Theory, Vol. 35, No. 4 (July, 1989), incorporated herein by reference.

Figure 1:
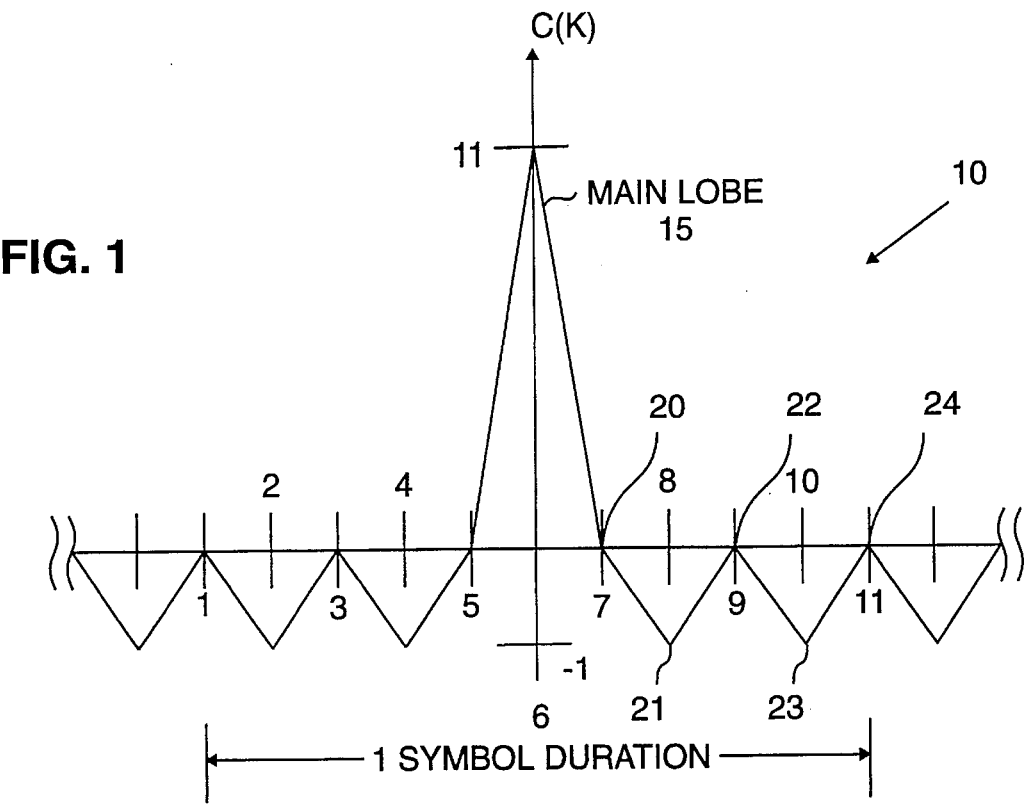
FIG. 1 is a graphical illustration of the correlation function at the output of a matched filter for an eleven chip Barker Code.

The particular patterns for the spread spectrum codes are chosen such that when the pattern is detected at the output of a filter matched to the characteristics of the selected pattern, the amplitude of the main lobe is much greater than the amplitude of the side lobes. FIG. 1 illustrates the output 10 of a matched filter for the well known 11 chip Barker code, which has a pattern of "+++− − −+− −+−", corresponding to a binary value of "0". Since the amplitude of the main lobe 15 is eleven times greater in magnitude than the amplitude of any side lobe, such as the side lobes 21 and 23, the position of the main lobe 15 may be easily identified, even under possible change in polarity.

Figure 2:
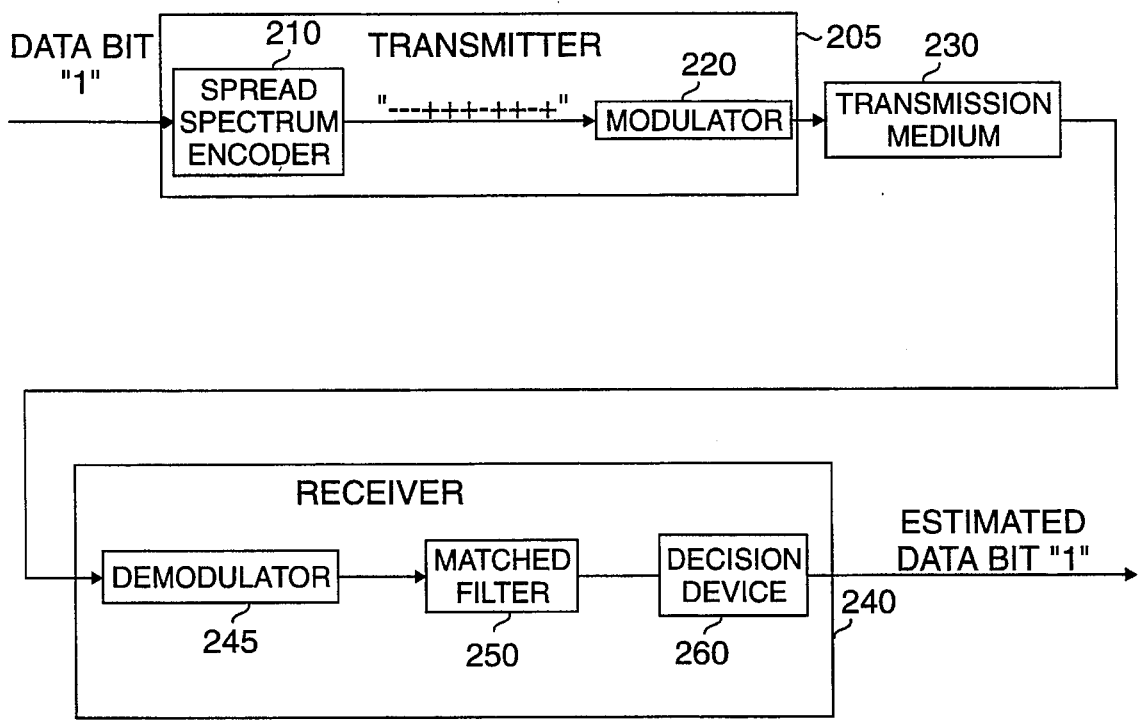
FIG. 2 is a schematic block diagram illustrating an exemplary spread spectrum communication system in accordance with the prior art.

Accordingly, as shown in FIG. 2, in order to transmit data using a conventional spread spectrum communication system 200, each bit to be sent by a transmitter 205 is first encoded by a spread spectrum encoder 210. Thus, if the encoder 210 is embodied as a Barker code generator, and a binary value of "1" is to be transmitted, the encoder 210 will generate a pattern of "− − −+++−++−+", which is the inverse Barker code. This information signal will then be modulated in a conventional manner by modulator 220 prior to transmission over a transmission medium 230, which may be embodied as a conventional or wireless telecommunications network. The modulator 220 may employ a modulation technique, for example, which multiplies the codeword by a sinusoidal carrier wave in order to shift the signal frequency upward to the carrier frequency. In this manner, the original signal spectrum may be translated into a particular frequency band allocated by the FCC, or another regulatory body.

Upon receipt of the transmitted signal by the receiver 240, the frequency of the received signal is first shifted down to the base band signal by a demodulator 245, thus returning the signal to its original form prior to modulation. Thereafter, the received signal is passed through a filter 250 that is matched to the characteristics of the particular codeword. A decision device 260 will identify whether the peaks associated with the main lobes at the output of the matched filter 250 have a positive or negative value. A positive main lobe may indicate a binary value of "0", and a negative main lobe may be utilized to indicate a binary value of "1".

As previously indicated, conventional spread spectrum systems will frequently increase the bit rate by transmitting a number of bits during a single symbol duration by utilizing phase-shift keying (PSK) modulation, wherein the phase of the carrier signal is shifted to represent data. In a quadrature phase-shift keying (QPSK) implementation, phase shifts in multiples of 90° are utilized. Thus, four possible signal states may be represented by each of the four phases. Accordingly, each signal element can represent two bits rather than one.

In a conventional spread spectrum code implementation, four possible signal states are achieved by modulating two orthogonal carrier signals, such as a sine and a cosine wave, by a positive or negative spread spectrum codeword. Thus, the sine wave modulated by a positive codeword can represent a binary value of "1" of a first bit, and when modulated by a negative codeword can represent a binary value of "0". Similarly, the concurrently transmitted cosine wave modulated by a positive codeword can represent a binary value of "1" of a second bit, and when modulated by a negative codeword can represent a binary value of "0". Thus, two bits of information may be conveyed per bit duration.

It is noted that the cosine wave-modulated codeword is frequently referred to as the in-phase (I) signal, and the sine wave-modulated codeword is frequently referred to as the quadrature (Q) signal.

According to one feature of the present invention, the information rate that may be achieved with spread spectrum modulation techniques may be further increased by modulating the position of the main lobe associated with the transmitted codeword at the output of the matched filter.

As shown in FIG. 1, for example, the eleven chip Barker code, upon matched filtering, will have a main lobe at position six that is one chip wide. Thus, additional information can be conveyed by manipulating the position of the main lobe, upon matched filtering, to appear in one of the other chip positions. If the position of the main lobe is varied among eight of the positions, eight signal states are available, and three additional bits may thereby be conveyed. Thus, one bit is conveyed by detecting the sign of the main lobe, and three additional bits are conveyed by detecting the position of the main lobe, for a total of four bits conveyed per symbol duration.

Further, in an implementation where the codeword is modulated by two orthogonal carrier signals, such as a sine and a cosine wave, as discussed above, a total of eight bits may thus be conveyed. Alternatively, a plurality of independently generated codewords may each be modulated by a respectively distinct carrier signal having a unique phase, amplitude or frequency. It is further noted that if a spread spectrum codeword having at least 16 chips is utilized, 16 signal states are available, and thus four additional bits of information could be conveyed for each codeword by modulating the position of the main lobe among 16 available positions.

Figure 3:
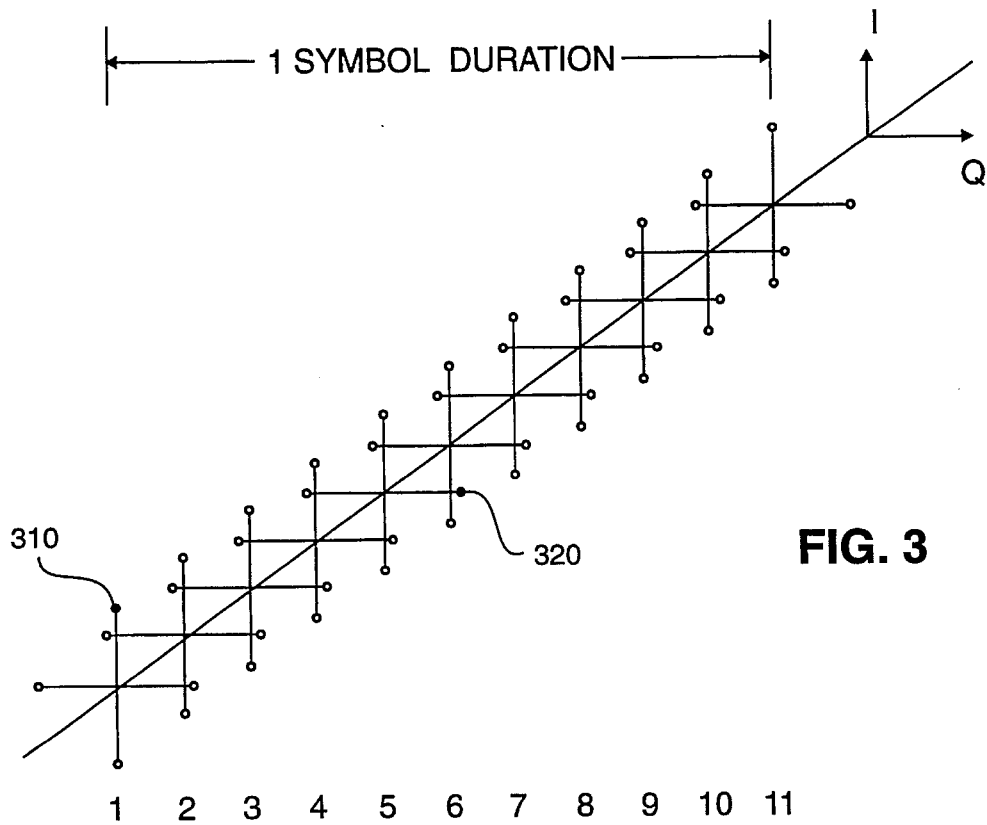
FIG. 3 is a graphical illustration of the modulation of the sign and position of the main lobe, upon matched filtering, for an eleven chip spread spectrum code.

FIG. 3 provides a graphical representation of the modulation of the sign and position for an eleven-chip spread spectrum code using two orthogonal carrier signals, I and Q. As previously indicated, in the illustrative embodiment, the position of the main lobe is manipulated to occupy one of eight available chip positions. Accordingly, the main lobe of the I signal may be positive or negative and occupy one of eight positions. Similarly, the main lobe of the Q signal may be positive or negative and occupy one of eight positions. Bullet points 310 and 320 are utilized in FIG. 3 to indicate the sign and position of the I and Q signals. In the illustration of FIG. 3, the I signal is positive, and is at location one, as shown by bullet point 310, while the Q signal is positive and is at location five, as shown by bullet point 320. As previously indicated, the illustrative embodiment may be utilized to convey eight bits of information.

In one embodiment, discussed further below, the position of the main lobe, upon matched filtering, may be manipulated within the defined symbol period by delaying the transmission of the codeword, by a positive or negative time period. Thus, in an implementation using an eleven chip codeword, if it is desired to position the main lobe in position 8, rather than in position 6, the natural position of the main lobe, the codeword generator should delay the transmission of the codeword by $2/11$ of the symbol period. Similarly, if it is desired to position the main lobe in position 2 rather than in position 6, the codeword generator should advance the transmission of the codeword by $4/11$ of the symbol period.

It is noted that a common problem in many transmission media is the delay spread of the transmitted signal which results from the different arrival times of multiple signal components due to multipath propagation. For example, in a wireless local area network, signal components will have differential propagation times due to multipath propagation that results from rays bouncing off boundaries, such as walls and floors. As a result, it is not uncommon for a one microsecond pulse to spread to five microseconds.

Due to the delay spread of the received signal, some of the signal components of one bit position may spill over into other bit positions, causing intersymbol interference (ISI). The effects of delay spread are minimized by conventional equalizing techniques, discussed further below, which serve to "squeeze" the pulses into the proper symbol time.

It is also noted that when the transmission of a spread spectrum codeword is delayed relative to the symbol duration period, in order to modulate the position of the main lobe at the receiver output, in accordance with the present invention, some of the side lobes may actually spill over into an adjacent symbol duration period. However, since the amplitudes of the side lobes are much less than the amplitude of the main lobe, the interference on the adjacent symbols caused by the techniques of the present invention is negligible with respect to the interference that results from more conventional sources, such as the delay spread that results from multipath propagation.

In addition, when there are additional chip positions available which are not utilized to convey information, such as in the illustrative embodiment where only eight of the eleven available chip positions are utilized, the additional unused positions serve as a guard band or buffer for purposes of further minimizing intersymbol interference.

Figure 4:
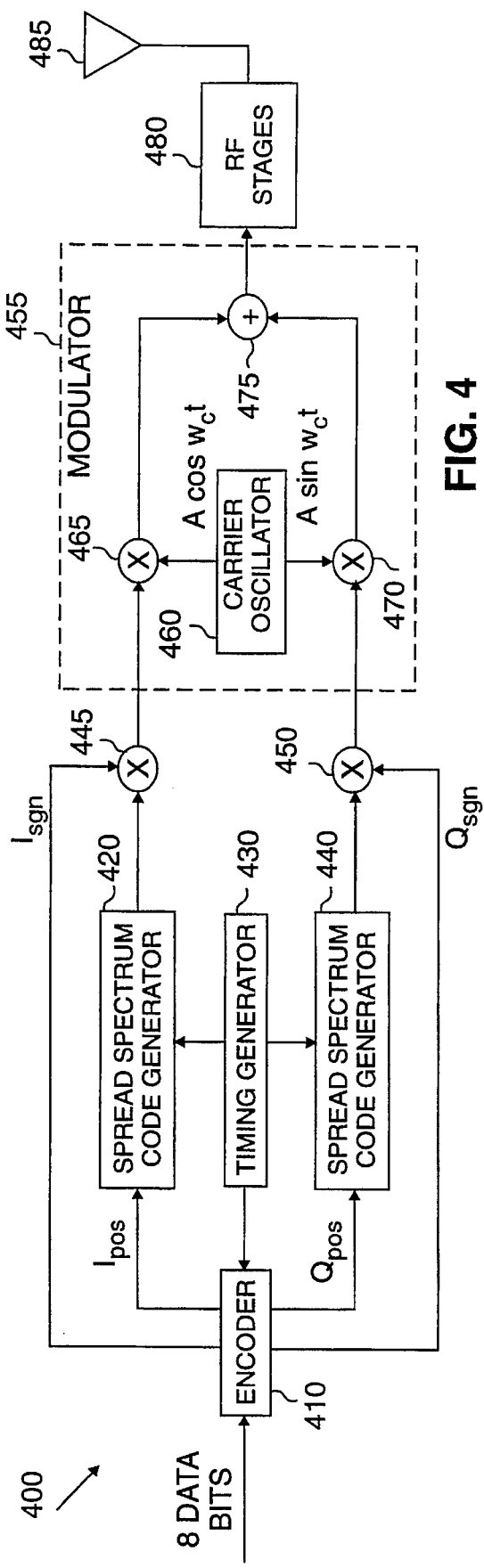
FIG. 4 is a schematic block diagram of an illustrative spread spectrum position modulated transmitter according to the present invention.

FIG. 4 is an exemplary implementation of a spread spectrum position modulated transmitter 400 in accordance with the present invention. In the exemplary transmitter 400, the bits to be sent by the transmitter 400 are first encoded by an encoder 410. For each 8 bit word to be transmitted, the encoder 410 will calculate the sign of the I and Q signals, $I_{sgn}$ and $Q_{sgn}$; in other words, whether the I and Q pulses, respectively, should have positive or negative pulses. In addition, the encoder 410 will calculate the position of the I and Q signals, $I_{pos}$ and $Q_{pos}$. It is noted that in the preferred embodiment, the values $I_{pos}$ and $Q_{pos}$ can be positive or negative time delay values, and indicate the time at which the respective spread spectrum code generators 420, 440, discussed below, should generate the spread spectrum code relative to the symbol duration period.

The encoder 410 and the spread spectrum code generators 420, 440, each operate according to the timing information that is received from the timing generator 430, which will generate time pulses in accordance with the symbol duration period, as appropriate for the preselected spread spectrum codeword. Specifically, in the illustrative embodiment, the encoder 410 will read in eight data bits to be transmitted for each indicated symbol duration period.

Thereafter, the encoder 410 will calculate the $I_{sgn}$, $Q_{sgn}$, $I_{pos}$ and $Q_{pos}$ values, preferably in a Gray encoded manner. The encoder 410 preferably Gray-encodes in each coordinate, such that opposite binary input data sequences are allocated to opposite polarity Barker codes. For example, if the following sequences are allocated to I-position three and Q-position five, then the following sequences are allocated to:

| Binary Sequence | I, O Polarity |
|---|---|
| 00100100 | +I, +Q |
| 00100101 | +I, −Q |
| 00100110 | −I, +Q |
| 00100111 | −I, −Q. |

The spread spectrum code generators 420, 440 will receive the appropriate time delay value, either $I_{pos}$ or $Q_{pos}$, and will then generate the spread spectrum codeword in accordance with the calculated delay value, relative to the spread spectrum symbol interval center. In this manner, the main lobes of the I and Q signals will be shifted appropriately, in order to convey the desired information.

The time-shifted codewords generated by the spread spectrum code generators 420, 440 will be multiplied by the polarity values indicated by the $I_{sgn}$ and $Q_{sgn}$ values, respectively, by the mixers 445 and 450. Thus, the output of the mixers 445 and 450 will be the two information carrying signals, in other words, the positive or negative values of the time-shifted spread spectrum codeword, as appropriate.

The information carrying signals will then be modulated in a conventional manner by modulator 455 prior to transmission. The modulator 455 may employ a modulation technique, for example, which multiplies the I signal time-shifted codeword by a cosine wave using mixer 465, and the Q signal time-shifted codeword by a sine wave using mixer 470. In this manner, the signal frequencies of the original information signals are shifted upward to the carrier frequency associated with the carrier oscillator 460, which may, for example, be in a particular frequency band allocated by the FCC, or another regulatory body.

The modulated I and Q signals will then be combined using an adder 475, before passing through conventional RF stages 480, which serve to amplify the modulated signals. Thereafter, the combined modulated I and Q signals may be transmitted over a transmission medium 485 to a receiver 500, discussed below in conjunction with FIG. 5. The transmission medium 485 may be embodied as a wired or a wireless telecommunications network.

Figure 5:
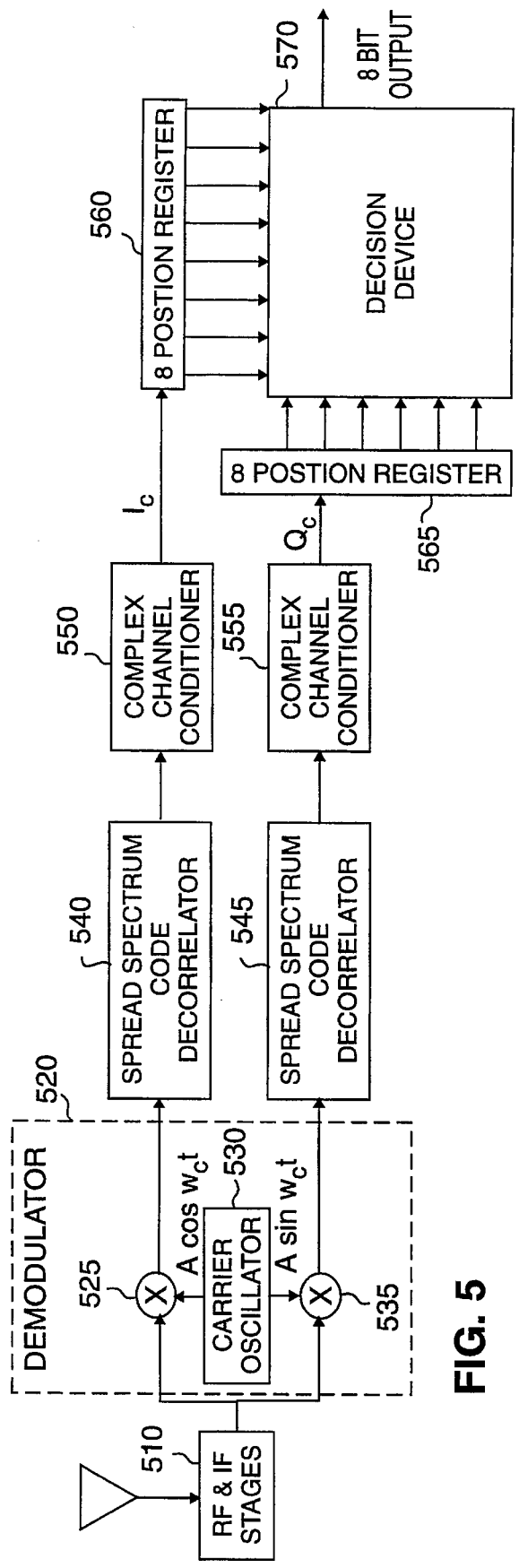
FIG. 5 is a schematic block diagram of an illustrative spread spectrum position modulated receiver according to the present invention.

FIG. 5 is an exemplary implementation of a spread spectrum position modulated receiver 500 in accordance with the present invention. In the exemplary receiver 500, the frequency of the received signal first passes through RF and IF stages 510, which serve to filter the received signal from the adjacent channel interference and to amplify the received signal. Thereafter, the frequency of the received signal is shifted down to the base band signal by a conventional demodulator 520, in order to return the received signal to its original form prior to modulation. In the illustrative embodiment, the I modulated signal is returned to baseband by multiplying it with a cosine wave, generated by carrier oscillator 530, using mixer 525, in order to isolate the I signal time-shifted codeword. In addition, the Q modulated signal is returned to baseband by multiplying it with a sine wave, using mixer 535, in order to isolate the Q signal time-shifted codeword.

The demodulated I signal time-shifted codeword and the Q signal time-shifted codeword are then passed through spread spectrum code decorrelators 540 and 545, respectively. The spread spectrum code decorrelators 540 and 545 are filters matched to the preselected codeword, in a known manner. Thus, the output of the spread spectrum code decorrelators 540 and 545 will be the correlation function of each signal, similar to the correlation function illustrated in FIG. 1 for an eleven chip Barker code. Due to the effects of delay spread, however, the main lobe and side lobes may be spread into the time period of an adjacent symbol, over the inherent spreading due to the Barker code side lobes themselves.

Accordingly, the I and Q signals are preferably conditioned by complex channel conditioners 550 and 555, respectively, which serve to compensate for the delay spread of the communication channels, in a known manner. The complex channel conditioners 550 and 555 may be embodied as a complex equalizer, of known type, or as filters which are matched to the particular delay spread characteristics of the communication channel, for example, by measuring the channel impulse by using a preamble signal before transmitting the data.

The conditioned I and Q signals, $I_c$ and $Q_c$, may then be analyzed to identify the sign and the position of each main lobe. In the illustrative embodiment, the eight chip positions of the I and Q signals that are utilized to convey information are preferably sampled and stored using eight-position registers 560 and 565, respectively. Thus, each position of the register 560, 565 will contain the amplitude value of the corresponding chip position of the I and Q signals.

Thereafter, the values stored in the positions of the registers 560 and 565 are analyzed by a decision device 570 in order to detect the sign and position of the main lobes of the I and Q signals and translate this information into the appropriate eight bit binary word. In a preferred embodiment, the decision device 570 identifies the sign and position of the main lobe of the I and Q signals by selecting the largest stored amplitude value in each of the registers 560 and 565, respectively. As previously indicated, in the illustrative embodiment, the sign of the main lobe of the I signal conveys one bit, and the position of the main lobe conveys an additional 3 bits. Similarly, the sign of the main lobe of the Q signal conveys one bit, and the position of the main lobe conveys an additional 3 bits. Thus, a total of eight bits of information are conveyed.

It is noted that where residual coupling occurs between the I and Q signals, the coupling coefficients can be taken into account in a more complex decision device 570.

It is to be understood that the embodiments and variations shown and described herein are illustrative of the principles of this invention only and that various modifications may be implemented by those skilled in the art without departing from the scope and spirit of the invention.

We claim:

1. An apparatus for transmitting information across a communication channel, said apparatus comprising:
   a first spread spectrum code generator for generating a first or second spread spectrum codeword to convey at least one bit of information, said codewords consisting of a plurality of chips transmitted during a symbol duration, said codewords having a main lobe in one of said chip positions upon matched filtering in a receiver;
   said first spread spectrum code generator further comprising a means for modulating the position of said codeword generated by said first spread spectrum code generator relative to the center of said symbol duration to modulate the position of said main lobe in said receiver output to convey one or more additional bits of information;
   a first carrier signal source;
   a modulator connected to said first spread spectrum code generator and said first carrier signal source, said modulator generating a first carrier signal modulated by said generated codeword having its position modulated relative to the center of said symbol duration; and
   means for applying said modulated carrier signal to an input of said communication channel.

2. The transmitter apparatus of claim 1, further comprising:
   a second spread spectrum code generator for generating a third or fourth spread spectrum codeword to convey at least one bit of information;
   said second spread spectrum code generator further comprising a means for modulating the position of said codeword generated by said second spread spectrum code generator relative to the center of said symbol duration to modulate the position of said main lobe in said receiver output to convey one or more additional bits of information;
   a second carrier signal source, said second carrier signal being distinguishable from said first carrier signal; and
   said modulator connected to said second spread spectrum code generator and said second carrier signal source, said modulator generating a second carrier signal modulated by said codeword generated by said second spread spectrum code generator and having its position modulated relative to the center of said symbol duration.

3. The transmitter apparatus of claim 1, wherein said second spread spectrum codeword is the inverse of said first spread spectrum codeword.

4. The transmitter apparatus of claim 2, wherein said fourth spread spectrum codeword is the inverse of said third spread spectrum codeword.

5. The transmitter apparatus of claim 1, wherein said communication channel is a wireless radio channel.

6. The transmitter apparatus of claim 1, wherein the frequency of said first carrier signal is in the Industrial, Scientific and Medical frequency band.

7. An apparatus for receiving a plurality of bits of information transmitted across a communication channel, one or more of said received bits being encoded using a first or second spread spectrum codeword transmitted during a symbol duration to convey at least one bit of information, said generated codeword having a main lobe upon matched filtering, one or more additional received bits being encoded by shifting the position of said generated codeword relative to the center of said symbol duration to modulate the position of said main lobe upon said matched filtering, said receiver apparatus comprising:

a filter matched to said first and second spread spectrum codewords;

means for analyzing said filter output to detect the polarity and position of said main lobe relative to the center of said symbol duration; and means for analyzing said polarity and position information of said main lobe to decode said transmitted data.

8. The receiver apparatus of claim 7, further comprising a complex channel conditioner which essentially compensates for the delay spread of said communication channel.

9. The receiver apparatus of claim 7, wherein said second spread spectrum codeword is the inverse of said first spread spectrum codeword.

10. The receiver apparatus of claim 7, wherein said communication channel is a wireless radio channel.

11. A communication system comprising:

a transmitter for encoding data using a spread spectrum codeword to convey at least one bit of information, said codeword consisting of a plurality of chips transmitted during a symbol duration, said codeword having a main lobe in one of said chip positions upon matched filtering, said transmitter further including means for shifting the position of said generated codeword relative to the center of said symbol duration to modulate the position of said main lobe upon said matched filtering to convey one or more additional bits of information;

a receiver including a filter matched to said codeword, said receiver further including means for analyzing said filter output to detect the polarity and position of said main lobe to decode said transmitted data; and a communication channel for connecting said transmitter and receiver.

12. The communication system of claim 11, wherein said communication channel is a wireless local area network.

13. A method for transmitting data across a communication channel, said transmission method comprising the steps of:

generating a first or second spread spectrum codeword to convey at least one bit of information, said codewords consisting of a plurality of chips transmitted during a symbol duration, said codeword having a main lobe in one of said chip positions upon matched filtering in a receiver;

modulating the position of said generated codeword relative to the center of said symbol duration to produce a modulated codeword in which the position of said main lobe in said receiver output is employed to convey one or more additional bits of information;

generating a first carrier signal;

modulating said first carrier signal using said modulated codeword; and applying said modulated carrier signal to an input of said communication channel.

14. The transmission method of claim 13, further comprising:

generating a third or fourth spread spectrum codeword to convey at least one bit of information;

modulating the position of said generated codeword relative to the center of said symbol duration to produce a modulated codeword in which the position of said main lobe in said receiver output is employed to convey one or more additional bits of information;

generating a second carrier signal, said second carrier signal being distinguishable from said first carrier signal; and modulating said second carrier signal using said modulated codeword.

15. The transmission method of claim 13, wherein said second generated codeword is the inverse of said first generated codeword.

16. The transmission method of claim 14, wherein said fourth generated codeword is the inverse of said third generated codeword.

17. The transmission method of claim 13, wherein said communication channel is a wireless radio channel.

18. A method for receiving a plurality of bits of information transmitted across a communication channel, one or more of said received bits being encoded using a first or second spread spectrum codeword transmitted during a symbol duration to convey at least one bit of information, said codeword having a main lobe upon matched filtering, one or more additional received bits being encoded by shifting the position of said generated codeword relative to the center of said symbol duration to modulate the position of said main lobe upon said matched filtering, said method for receiving comprising the steps of:

filtering said received signal using a filter matched to said spread spectrum codewords;

analyzing said filter output to detect the polarity and position of said main lobe relative to the center of said symbol duration; and analyzing the polarity and position of said main lobe to decode said transmitted data.

19. The receiver method of claim 18, further comprising the steps of conditioning said filtered signal using a complex channel conditioner which essentially compensates for the delay spread of said communication channel.

20. The receiver method of claim 18, wherein said communication channel is a wireless radio channel.

* * * * *